United States Patent
Kato et al.

(10) Patent No.: US 10,671,674 B2
(45) Date of Patent: Jun. 2, 2020

(54) FINDING A PROBLEM IN PROCEDURES DESCRIBED IN A GUIDE DOCUMENT

(71) Applicant: International Business Machines Corporation, Armonk, NY (US)

(72) Inventors: Junichi Kato, Tokyo (JP); Takayuki Kushida, Tokyo (JP); Tomoko Murayama, Kanagawa-ken (JP); Masaharu Sakamoto, Kanagawa (JP); Kazuto Yamafuji, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 15/487,556

(22) Filed: Apr. 14, 2017

(65) Prior Publication Data

US 2018/0300428 A1    Oct. 18, 2018

(51) Int. Cl.
| | | |
|---|---|---|
| G06F 16/00 | (2019.01) | |
| G06F 16/903 | (2019.01) | |
| G06F 16/9038 | (2019.01) | |
| G06F 16/93 | (2019.01) | |
| G06F 11/30 | (2006.01) | |

(52) U.S. Cl.
CPC .... G06F 16/90344 (2019.01); G06F 11/3051 (2013.01); G06F 16/9038 (2019.01); G06F 16/93 (2019.01)

(58) Field of Classification Search
CPC ........... G06F 16/90344; G06F 16/9038; G06F 11/3051; G06F 11/2289; G06F 16/93
USPC ....................................................... 707/690
See application file for complete search history.

(56) References Cited

U.S. PATENT DOCUMENTS

| | | | |
|---|---|---|---|
| 6,338,149 B1 * | 1/2002 | Ciccone, Jr. ............... | G06F 8/65 714/38.12 |
| 8,069,374 B2 | 11/2011 | Panigrahy et al. | |
| 8,589,914 B2 | 11/2013 | Wookey | |
| 8,627,289 B2 | 1/2014 | Farrell et al. | |
| 8,762,958 B2 | 6/2014 | Golender et al. | |
| 8,813,063 B2 | 8/2014 | Uthe | |
| 9,313,091 B1 | 4/2016 | Schnegelberger et al. | |
| 9,430,363 B1 | 8/2016 | Hisagi et al. | |

OTHER PUBLICATIONS

Brown et al., "A Model of Configuration Complexity and Its Application to a Change Management System", retrieved from internet Mar. 2017, 14 pages.
IBM Security QRadar: Installation Guide, Version 7.2.6, IBM Corporation 2004, 2015, 76 pages.

* cited by examiner

Primary Examiner — Vincent F Boccio
(74) Attorney, Agent, or Firm — Richard Wilhelm; Edell, Shapiro & Finnan, LLC

(57) ABSTRACT

The present invention may be a method, a computer system, and a computer program product. An embodiment of the present invention provides a method for finding a problem in procedures described in a guide document for install and configuration of software. The method comprises calculating, using a dynamic programming matching, a distance between an install-and-configuration log generated by executing the install and configuration of the software according to the guide document at a user-side computer and a log template generated by executing the install and configuration of the software according to the guide document at an administrator-side computer, and finding a problem in the procedures, using the distance.

19 Claims, 12 Drawing Sheets

| MANUFACTURER | PRODUCT NAME | USAGE |
|---|---|---|
| MFR | Virtual appliance | Consolidates data for a large number of log source events from devices distributed throughout a network. It normalizes and correlates log data instantly, and distinguishes true threats from false detections. It generates detailed reports relating to data access and user activity. It includes RHEL. |
| | Virtual appliance | Consolidates data for a large number of log source events from devices distributed throughout a network. It normalizes and correlates log data instantly, and distinguishes true threats from false detections. It generates detailed reports relating to data access and user activity. It includes RHEL. It configures HA. |
| | Software Only | Collects logs and events from resources such as security devices, operating systems, applications, databases and ID and access management products. |
| | Software Only | Consolidates data for a large number of log source events from endpoints and applications of devices distributed throughout a network. It normalizes and correlates log data instantly, and distinguishes true threats from false detections. It generates detailed reports relating to data access and user activity. It does not include RHEL. |
| | Log Manager Virtual Appliance | Consolidates data for a large number of log source events from endpoints and applications of devices distributed throughout a network. It normalizes and correlates log data instantly, and distinguishes true threats from false detections. It includes RHEL. It configures HA |
| | Vulnerability Manager Virtual Appliance | Adds a vulnerability detection function to Log Manager. A vulnerability detection function is installed by default. It includes RHEL. |

Fig. 5

| MANUFACTURER | PRODUCT NAME | USAGE | COMPLEXITY | ACCURACY | GOODNESS-OF-FIT | DERIVATION |
|---|---|---|---|---|---|---|
| MFR | Virtual appliance | Consolidates data for a large number of log source events from devices distributed throughout a network. It normalizes and correlates log data instantly, and distinguishes true threats from false detections. It generates detailed reports relating to data access and user activity. It includes RHEL. | 50.2 | 8.4 | 7 | △ |
| | | Consolidates data for a large number of log source events from devices distributed throughout a network. It normalizes and correlates log data instantly, and distinguishes true threats from false detections. It generates detailed reports relating to data access and user activity. It includes RHEL. It configures HA. | 70.1 | 8 | 8 | △ |
| | | Collects logs and events from resources such as security devices, operating systems, applications, databases and ID and access management products. | 52.7 | 6.4 | 4 | △ |
| | Software Only | Consolidates data for a large number of log source events from endpoints and applications of devices distributed throughout a network. It normalizes and correlates log data instantly, and distinguishes true threats from false detections. It generates detailed reports relating to data access and user activity. It does not include RHEL. | 43.9 | 5 | 6 | △ |
| | Log Manager Virtual Appliance | Consolidates data for a large number of log source events from endpoints and applications of devices distributed throughout a network. It normalizes and correlates log data instantly, and distinguishes true threats from false detections. It includes RHEL. It configures HA | 53.7 | 5.8 | 6 | △ |
| | Vulnerability Manager Virtual Appliance | Adds a vulnerability detection function to Log Manager. A vulnerability detection function is installed by default. It includes RHEL. | 41.0 | 4.5 | 5 | △ |

Fig. 7

FINDING A PROBLEM IN PROCEDURES DESCRIBED IN A GUIDE DOCUMENT

BACKGROUND

The present invention embodiments relate to a guide document for install and configuration of software, and more specifically, to a technique for finding a problem in procedures described in the guide document.

Despite the fact that software installation work is a first experience for a user in many cases, information to be input is large during executing an install and configuration of software. Further, a work flow of an install and configuration of software is also complicated. Accordingly, we often face difficulties of an install and configuration of software. Therefore, many users encounter the same mistakes and troubles during an install and configuration of software.

A lot of information such as official or informal information, guides as well as stories of user's experiences is flooding an internet or intranet, but it is difficult to find out which information is useful or which information is suited to user's own purpose.

SUMMARY

According to one aspect of an embodiment of the present invention, the embodiment of the present invention provides a server computer-implemented method for finding a problem in procedures described in a guide document for install and configuration of software. The method includes calculating, using a dynamic programming matching, a distance between an install-and-configuration log generated by executing the install and configuration of the software according to the guide document at a user-side computer and a log template generated by executing the install and configuration of the software according to the guide document at an administrator-side computer, and finding a problem in the procedures, using the distance.

According to another aspect of an embodiment of the present invention, a system, such as a computer system, comprises a computer readable storage medium storing a program of instructions executable by the computer system to perform one or more methods described herein.

According to another aspect of an embodiment of the present invention, a computer program product comprises a computer readable storage medium storing a program of instructions executable by the computer system to perform one or more methods described herein.

BRIEF DESCRIPTION OF THE DRAWINGS

The disclosure will provide details in the following description of preferred embodiments with reference to the following figures.

FIG. 5 illustrates an embodiment of a portal site for selecting a guide document for install and configuration of software.

FIG. 7 illustrates an embodiment of a presentation layer according to an embodiment of the present invention.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the example definitions are provided hereinafter, but the meaning of the terms should be interpreted broadly as known to the technical field to which the present invention relates.

The term, "guide document for install and configuration of software", may refer to any document which was written for installing software. The document is written with any electrical format, such as a markup language, for example, an HTML, an XML or an XHTML.

The term, "dynamic programming", may refer to a technique for carrying out approximate string matching between strings or documents.

Figure 1:
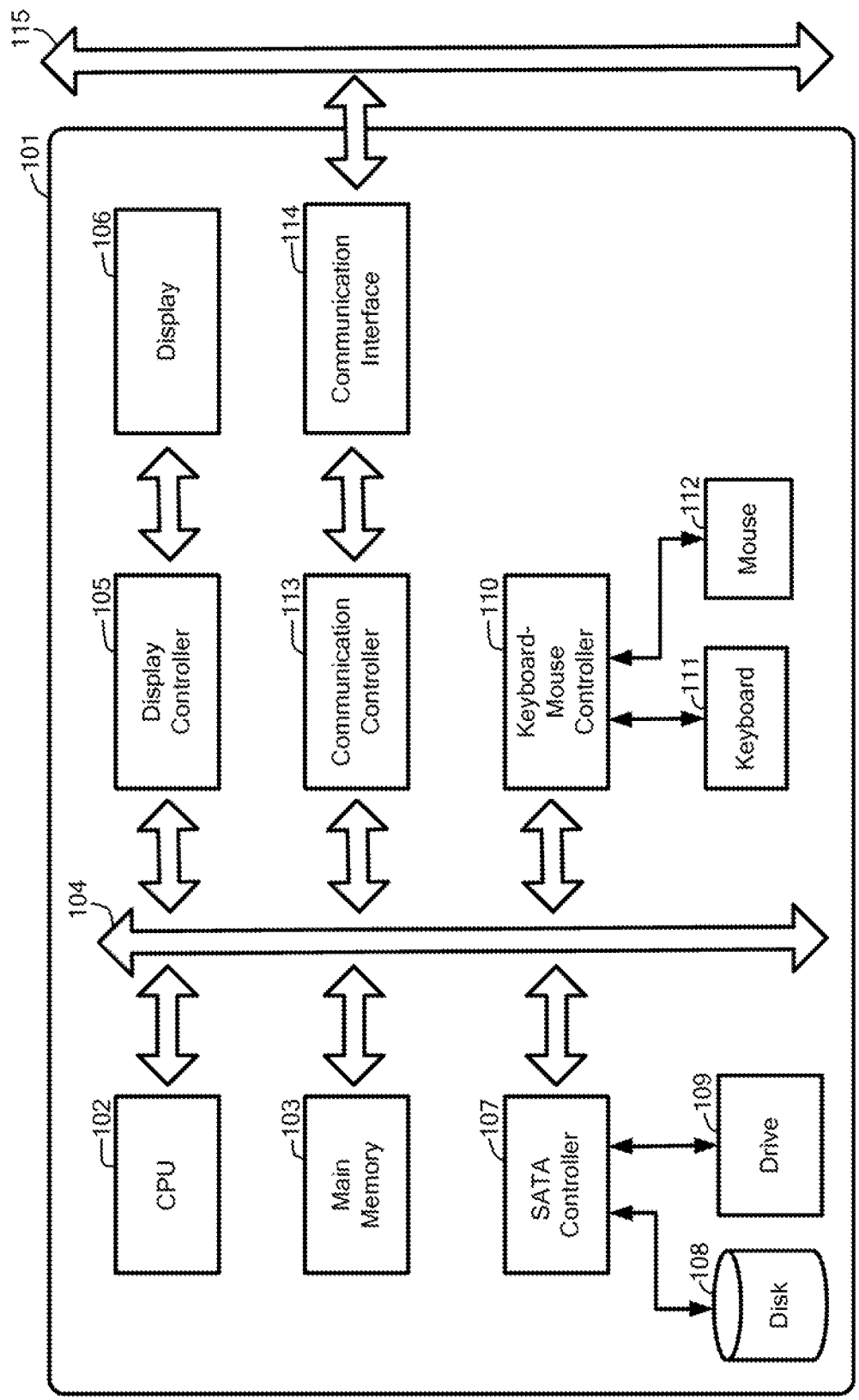
FIG. 1 illustrates an example basic block diagram of computer hardware used in an embodiment of the present invention.

With reference now to FIG. 1, FIG. 1 illustrates an example basic block diagram of computer hardware used in an embodiment of the present invention. The computer may be used as an administrator-side computer mentioned in FIG. 2 according to an embodiment of the present invention or a user-side computer mentioned in FIG. 2.

A computer (101) may be, for example, but is not limited to, a desktop, laptop, notebook or server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. The display may have a touch screen or a non-touch screen. The display may be for example, but not limited to, a LCD, PDP, OEL or a projection type display. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Prior to explaining an embodiment of the present invention, conventional display of evaluation results relating to a guide document is explained below by referring to FIG. 10.

Figure 10:
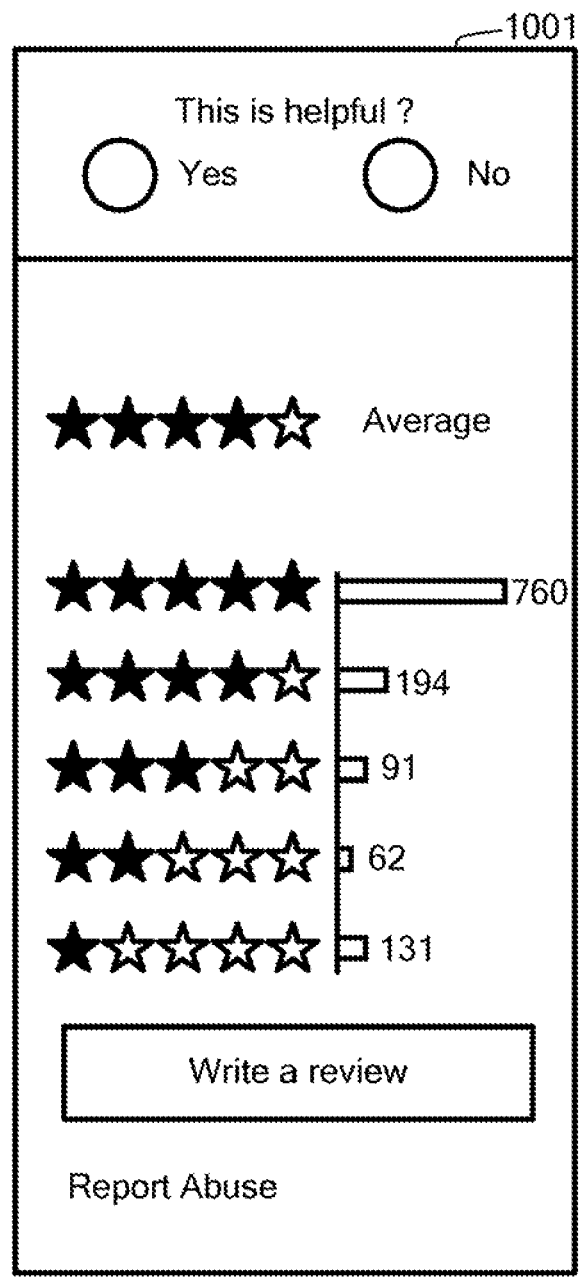
FIG. 10 illustrates an example of displaying evaluation results relating to a guide document.

With reference now to FIG. 10, FIG. 10 illustrates an example of displaying evaluation results relating to a guide document.

The window (1001) shows that a guide document is helpful or not using a star mark(s) with a bar which shows the number of users who voted. However, the window (1001) does not show a comparison of usefulness among a plurality of guide documents which were written for the common software. Further, the window (1001) does not show where in the guide document there is a problem.

Accordingly, it is advantageous to present a comparison of usefulness among a plurality of guide documents, and to present a problem in the guide document.

Hereinafter, an embodiment of the present invention will be described with reference to the following FIG. 2, FIG. 3, FIGS. 4A and 4B, FIG. 5, FIGS. 6A and 6B, FIG. 7, FIG. 8 and FIG. 9.

Figure 2:
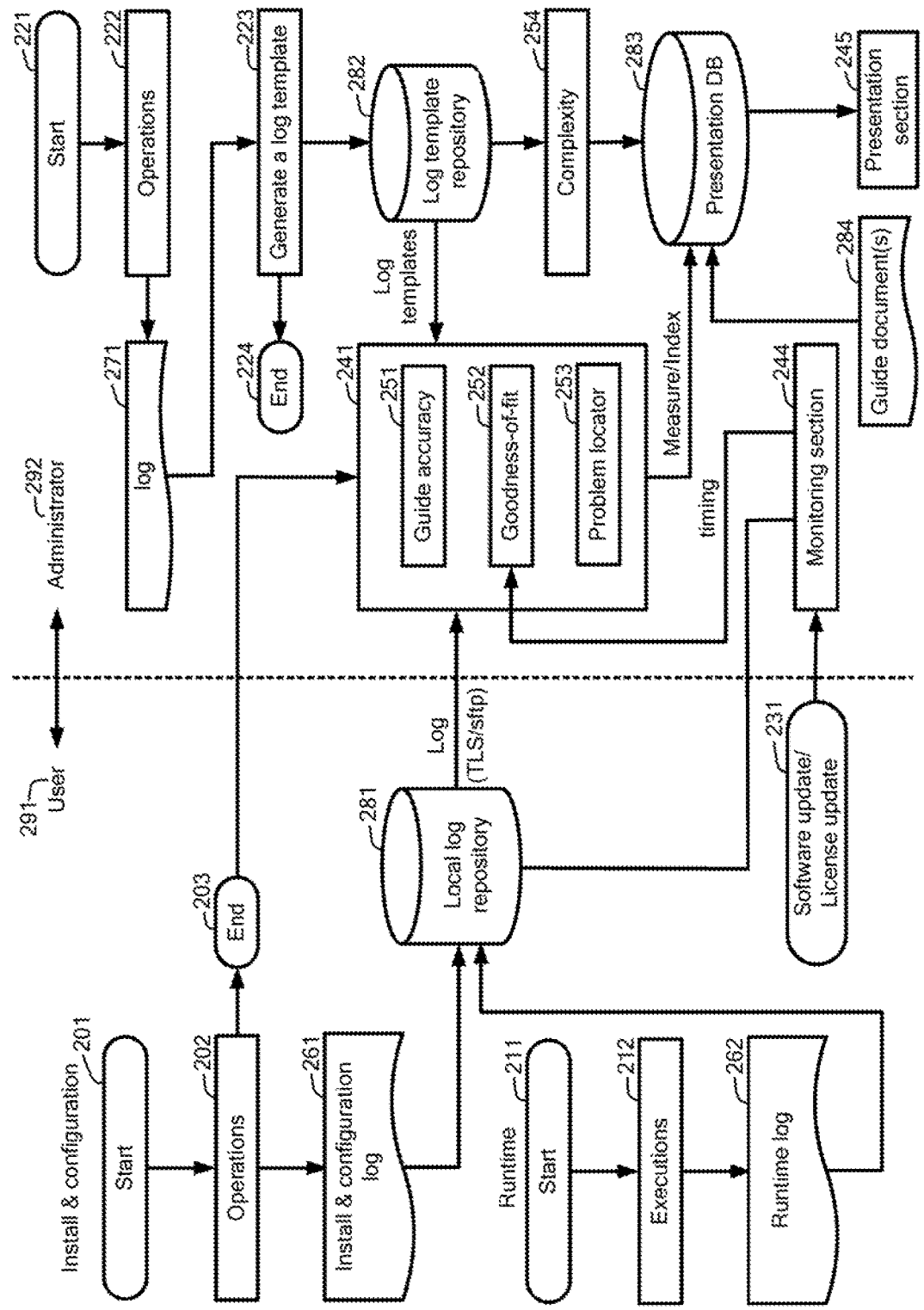
FIG. 2 illustrates an embodiment of a representative process for finding a problem in procedures described in a guide document for install and configuration of software and a functional block diagram used in accordance with the embodiment of the process.

With reference now to FIG. 2, FIG. 2 illustrates an embodiment of a process for finding a problem in procedures described in a guide document for install and configuration of software and a functional block diagram used in accordance with the embodiment of the process.

In FIG. 2, flowcharts performed at a user-side computer (291) and flowcharts performed at an administrator-side computer (292) are illustrated separately.

The user-side computer (291) may refer to hardware on which target software may be installed and configured.

A user at the user-side computer (291) may refer to a person who requires a support service for an install and configuration of software.

The administrator-side computer (292) may refer to hardware which may provide a support service for supporting an install and configuration of software by providing at least one of a guide document for install and configuration of software and a portal site for selecting a guide document.

An administrator at the administrator-side computer (292) may refer to a person who is a manager of the administrator-side computer (292).

Hereinafter, the operations made at the user-side computer (291) and the operations made at the administrator-side computer (292) are separately explained in the items 1 to 6 mentioned below.

Let us suppose that at least one of guide documents (284) for install and configuration of software are provided and stored into a presentation database (hereinafter referred to as "presentation DB") (283). Further, let us suppose that the administrator-side computer (292) provides a portal site which may enable a user to select a guide document stored in the presentation DB (283).

1. Operations for install and configuration done at the user-side computer (291) for obtaining an install-and-configuration log.

Steps 201 to 203 may be performed at the time when software is installed and configured on the user-side computer (291).

In step 201, the user-side computer (291) starts a process for executing the install and configuration of the software according to the guide document for the software to obtain an install-and-configuration log.

In step 202, the user-side computer (291) accesses the portal site and then displays the portal site on the display (for example, 106 described in FIG. 1). The portal site may present one or more guide documents.

In a case where the user may select one guide document presented on the display, the selected guide document is downloaded to the user-side computer (291).

The user may open the downloaded guide document to read it on the display or print out the downloaded guide document, and then install and configure the software, according to the downloaded or printed guide document.

In response to the operations done by the user, the user-side computer (291) generates an install-and-configuration log (261) and then stores the install-and-configuration log (261) into a local log repository (281). The install-and-configuration log (261) may include a mapping table between an index in the downloaded guide document and a series of subset logs which were output when operations were done according to the descriptions relating to the index.

In step 203, the user-side computer (291) terminates the process mentioned above in a case where the software was installed and configured on the user-side computer (291).

2. Operations done at the administrator-side computer (292) for preparing a log template.

Steps 221 to 224 may be performed at the time when a log template is generated at the user-side computer (291).

In step 221, the administrator-side computer (292) starts a process for executing the install and configuration of the software according to the guide document to obtain a log template.

In step 222, the administrator-side computer (292) retrieves the guide document which is the same as that selected by the user at the user-side computer (291).

The administrator may open the retrieved guide document then install and configure the software by referring to the retrieved guide document. The software installed and configured on the administrator-side computer (292) is the same as that installed and configured on the user-side computer (291). One or more administrators may perform the install and configure of the software to obtain one or more log templates.

In response to the operations done by the administrator, the administrator-side computer (292) generates a log (271) and generates a log template (223) from the generated log (271). The administrator-side computer (292) may further calculate a complexity of an install and configuration of software. The details of calculating the complexity will be mentioned in the item 5 mentioned below. The administrator-side computer (292) then stores the log template (223) into a log template repository (282).

In step 224, the administrator-side computer (292) terminates the process mentioned above in a case where the software was installed and configured on the administrator-side computer (292).

3. Runtime operations done at the user-side computer (291) in a case where the installed software works without a problem or with a problem In step 211, the user-side computer (291) starts a process for collecting a log obtained by executing the installed software.

In step 212, the user executes the installed software. In a case where the installed software works well without a problem, the user-side computer (291) lists log events which are detected during the execution of the installed software and then stores the log events as a runtime log (262) into the local log repository (281). In a case where the software does not work well due to an unsuitable install and configuration, the user-side computer (291) lists error log events which are detected during the execution of the installed software and then stores the error log events as the runtime log (262) into the local log repository (281).

4. Monitoring software update or a license update at administrator-side computer (292).

The administrator-side computer (292) may have a monitoring section (244). The monitoring section (244) may monitor software update or license update (231) which was done at the user-side computer (291). The monitoring may start in response to start of executing the software by a user. The monitoring may be done, for example, by monitoring software. In response to the detection of the software update or license update (231), the administrator-side computer (292) may calculate a goodness-of fit for selecting software, as mentioned below.

5. Obtaining, at administrator-side computer (292), a complexity of an install and configuration of software, an accuracy of a guide document, and a goodness-of fit for selecting software, and finding a problem in the procedures.

The administrator-side computer (292) may have at least one of the following sections: a measure calculating section (241) and a complexity calculating section (254). The measure calculating section (241) may comprise a guide accuracy calculating section (251), a goodness-of-fit calculating section (252) and a problem locator section (253).

The guide accuracy calculating section (251) may calculate an accuracy of a guide document. The calculation of the accuracy may be done using a distance between the install-and-configuration log which is stored in the local log repository (281) and the log template which is stored in the log template repository (282). The calculated accuracy may be stored in a presentation DB (283). The details of calculating the accuracy will be explained below by referring to a flowchart described in FIG. 4B.

The goodness-of-fit calculating section (252) may calculate a goodness-of-fit. The calculation of the goodness-of-fit may be done using a runtime log (262). The calculated goodness-of-fit may be stored in a presentation DB (283). The details of calculating the goodness-of-fit will be explained below by referring to a flowchart described in FIG. 4B.

The problem locator section (253) may find a problem in the procedures described in a guide document for install and configuration of software. The finding is performed by retrieving from the log template one or more logs associated with a path having a distance larger than a predetermined threshold among paths generated by the dynamic programming matching, and then searching for an index or indexes associated with the one or more logs in a mapping table of indexes in the guide document and of the log template. The details of finding a problem will be explained below by referring to a flowchart described in FIG. 4B and FIGS. 6A and 6B.

The complexity calculating section (254) may calculate a complexity of an install and configuration of software. The calculation of the complexity may be done using a log template which is stored in the log template repository (282). The details of calculating the complexity will be explained below by referring to a flowchart described in FIG. 4B.

6. Presenting a complexity of an install and configuration of software, an accuracy of a guide document, a goodness-of fit for selecting software, a problem in procedures described in a guide document for install and configuration of software.

The administrator-side computer (292) may have a presentation section (245). The presentation section (245) may present evaluation information on a guide document, such as a complexity of an install and configuration of software, an accuracy of a guide document, a goodness-of fit for selecting software, a problem in procedures described in a guide document for install and configuration of software, or a combination thereof.

According to an embodiment of the present invention, the evaluation value of a guide document is presented to a user. Accordingly, objective and detailed judgment criterion for selecting a guide document is served to a user according to an embodiment of the present invention.

Figure 3:
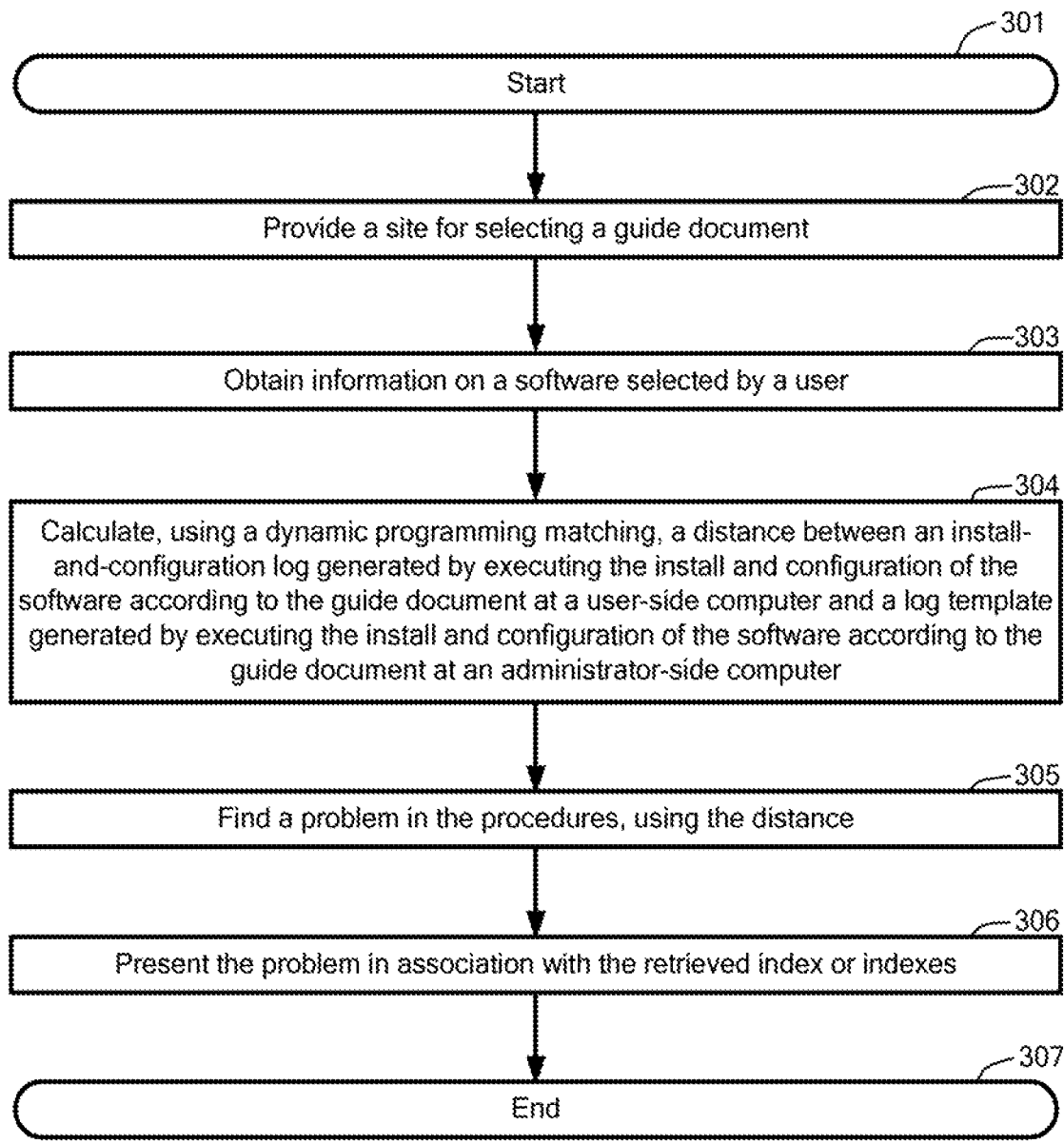
FIG. 3 illustrates a flowchart of a process for finding a problem in procedures described in a guide document for install and configuration of software.

With reference now to FIG. 3, FIG. 3 illustrates a flowchart of a representative process for finding a problem in procedures described in a guide document for install and configuration of software.

A subject of each step described in FIG. 3 may be the administrator-side computer (292) described in FIG. 2.

Let us suppose that at least one guide document for install and configuration of software is provided and stored into a presentation DB. Each guide document may have one or more indexes.

In step 301, the administrator-side computer (292) starts the process mentioned above.

In step 302, the administrator-side computer (292) provides a site, such as a portal site, for selecting a guide document for install and configuration of software via an internet or intranet. The portal site may present one or more indexes for selecting a guide document. Examples of the portal site will be explained below by referring to FIGS. 5 and 7 mentioned below.

Let us suppose that a user at a user-side computer may select one guide document presented on the display.

In step 303, the administrator-side computer (292) obtains information on software selected by a user in response to the selection of the software.

In step 304, the administrator-side computer (292) retrieves an install-and-configuration log generated by executing the install and configuration of the software according to the guide document at a user-side computer and a log template generated by executing the install and configuration of the software according to the guide document at an administrator-side computer (292) and then calculates a distance between the install-and-configuration log and the log template using a dynamic programming matching.

In one embodiment, the distance may be calculated, for example, but not limited to, using the Longest Common Subsequence.

In another embodiment, each log in the install-and-configuration log and each log in the log template may be classified according to types of the log, and the distance in a case where the types are different from each other may be set so as to be longer than the distance in a case where the types are common with each other.

In step 305, the administrator-side computer (292) finds a problem in procedures described in the guide document.

The finding may be performed by retrieving from the log template one or more logs associated with a path having a distance larger than a predetermined threshold among paths generated by the dynamic programming matching, and then searching for an index or indexes associated with the one or more logs in a mapping table of indexes in the guide document and of the log template.

The retrieved index or indexes may be the problem in the procedures.

In step 306, the administrator-side computer (292) presents the problem in association with the retrieved index or indexes.

The problem in the procedures may be presented in association with the retrieved index or indexes.

In step 307, the administrator-side computer (292) terminates the process mentioned above.

Figure 4A:
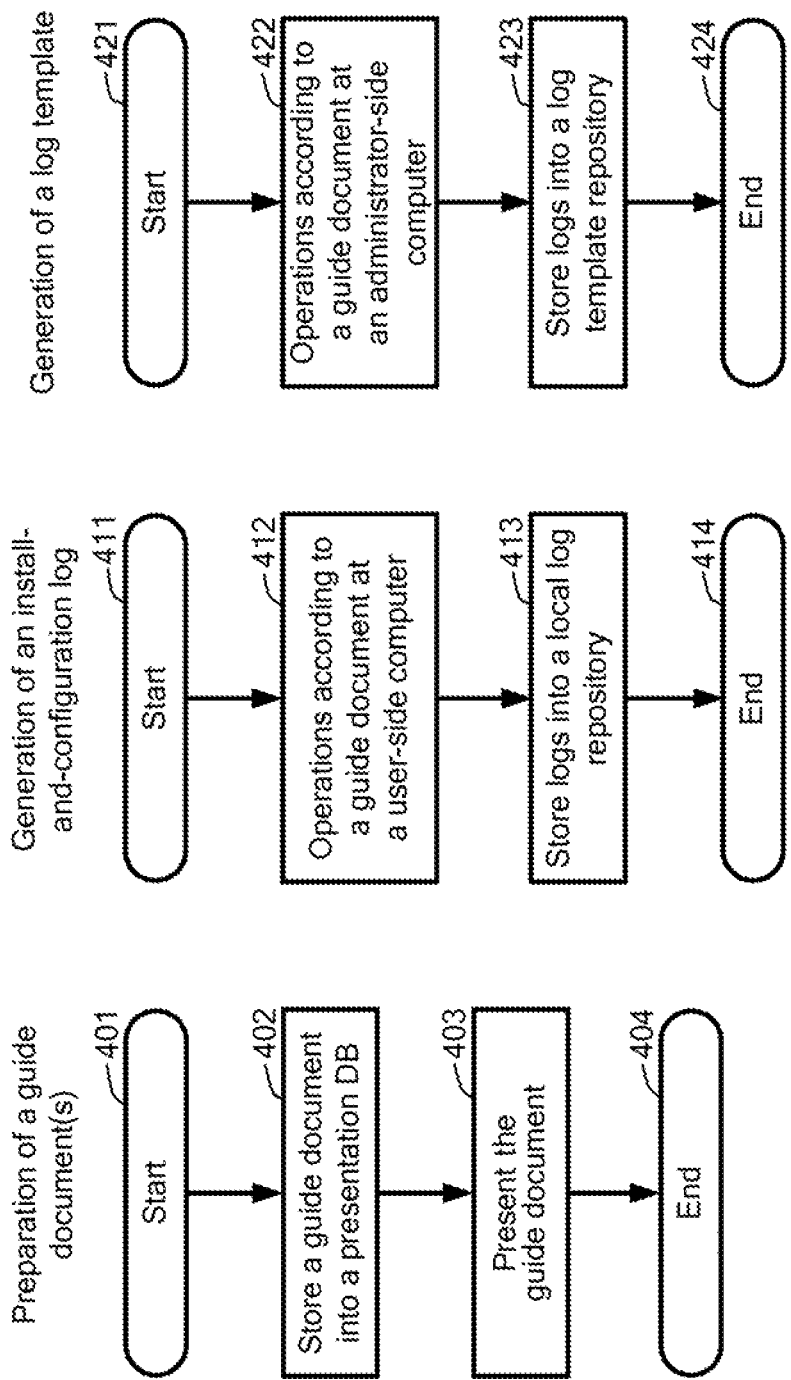
FIGS. 4A and 4B illustrate flowcharts of a process relating the process described in FIGS. 2 and 3.
Figure 4B:
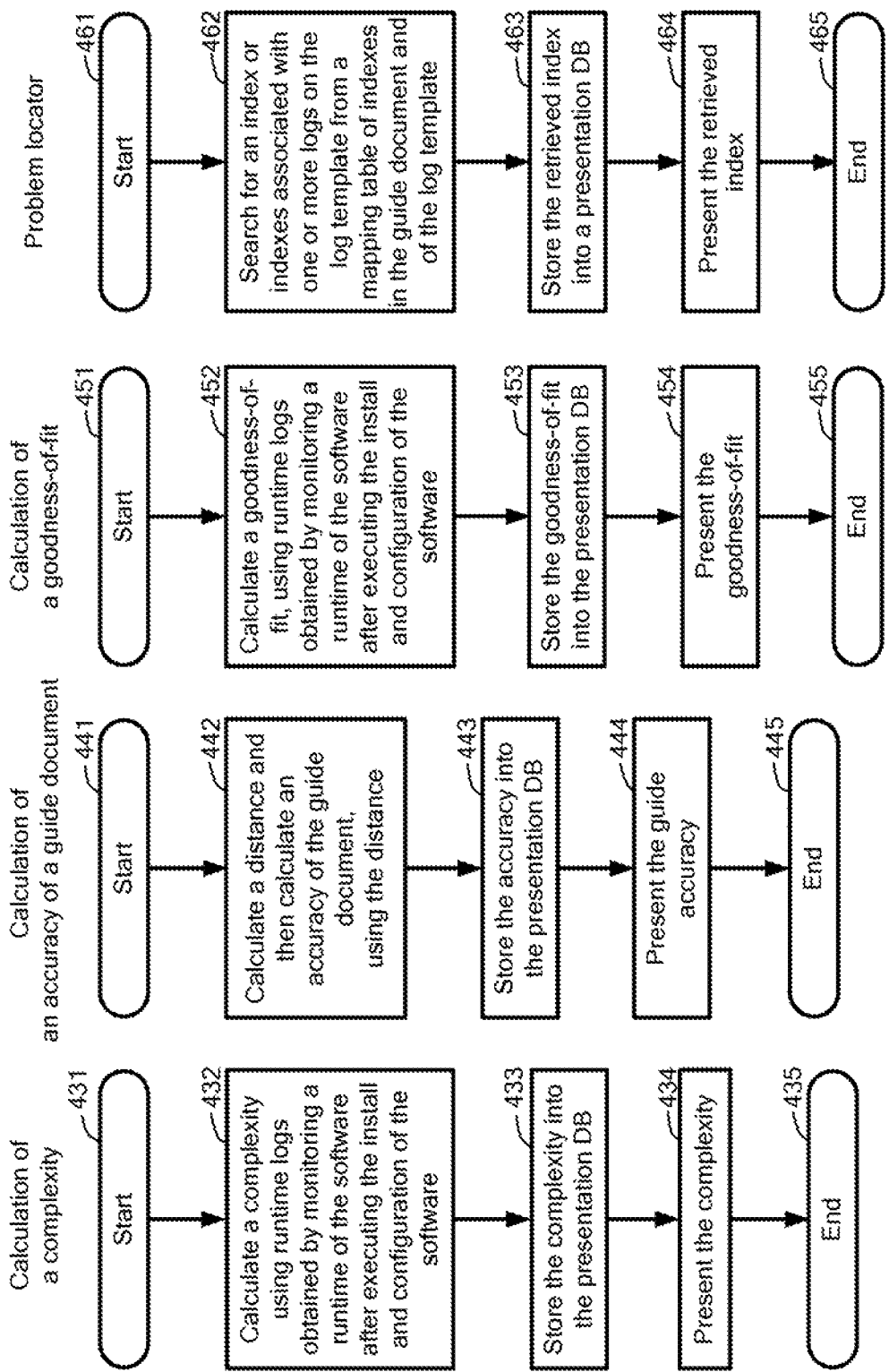

FIGS. 4A and 4B illustrate detailed flowcharts of a process relating the process described in FIGS. 2 and 3.

A. Preparation of a Guide Document(s)

In step 401, the administrator-side computer (292) starts a process for preparing one or more guide documents used for install and configuration of software.

In step 402, the administrator-side computer (292) stores the one or more documents into a presentation DB.

In step 403, the administrator-side computer (292) presents the one or more documents via a portal site which enables a selection of a guide document stored in the presentation DB.

In step 404, the administrator-side computer (292) terminates the process mentioned above.

B. Generation of an Install-and-Configuration Log

In step 411, the user-side computer (291) starts a process for generating an install-and-configuration log.

In step 412, a user starts to execute an install and configure the software, according to the guide document which was selected by the user. In response to the operations done by the user, the user-side computer (291) generates an install-and-configuration log.

In step 413, the user-side computer (291) stores the install-and-configuration log into a local log repository.

In step 414, the user-side computer (291) terminates the process mentioned above in a case where the software was installed and configured on the user-side computer (291).

C. Generation of a Log Template

In step 421, the administrator-side computer (292) starts a process for generating a log template.

In step 422, an administrator starts to execute an install and configure of the software, according to the guide document. The software which is to be installed and configured on the administrator-side computer (292) is the same as that installed and configured on the user-side computer (291). The guide document which is referred by the administrator is the same as that selected by the user at the administrator-side computer (292). In response to the operations done by the administrator, the administrator-side computer (292) generates a log template.

In step 423, the administrator-side computer (292) stores the log template into a log template repository.

In step 424, the administrator-side computer (292) terminates the process mentioned above in a case where the software was installed and configured on the administrator-side computer (292).

D. Calculation of a Complexity of an Install and Configuration of Software

In step 431, the administrator-side computer (292) starts a process for calculating a complexity of an install and configuration of software.

In step 432, the administrator-side computer (292) retrieves, from the local log repository, runtime logs obtained by monitoring a runtime of the software after executing the install and configuration of the software and then calculates a complexity using the retrieved runtime logs.

The calculation of the complexity may be done using a weighted sum of the number of a certain operation or event during an execution of the install and configuration of the software. The certain operation or event may comprise, for example, a selection done by a user during the execution of the install and configuration of the software, a transition of panels during the execution of the install and configuration of the software, or a combination thereof. A selection done by a user may comprise, for example, a selection by a mouse operation or by a key operation. A transition of panels may comprise, for example, a displaying of a new window or a new pop-up window, or a change of a web page.

Let us suppose that a certain operation or event, En, is observed as an output log and the weight of the certain operation or event is taken as Wn, the following formula may be used for calculating the above-mentioned complexity:

$$\text{Complexity} = \text{sum}(W_n * E_n), \text{ where } n=1,2,3, \ldots N, N \text{ being a positive integer.}$$

Wn may be assumed that a subjective evaluation value of the complexity obtained from a large number of users is represented by a weighted linear sum of the number of the certain operation or event. A weight of Wn may be determined, for example, by a regression analysis. The regression analysis is one embodiment for determining Wn.

In step 433, the administrator-side computer (292) stores the complexity into the presentation DB.

In step 434, the administrator-side computer (292) presents the complexity, evaluation value or information, such as an icon, associated with the complexity or a combination thereof to a user. The presentation of the complexity may be done, for example, by displaying information on the complexity at the time when a corresponding guide document is presented on a portal site. The complexity may be provided to a user as an indicator for selecting the guide document. An example of the presentation of the complexity will be explained below by referring to FIG. 7 mentioned below.

In step 435, the administrator-side computer (292) terminates the process mentioned above.

E. Calculation of an Accuracy of a Guide Document

In step 441, the administrator-side computer (292) starts a process for calculating an accuracy of a guide documents.

In step 442, the administrator-side computer (292) calculates a distance between an install-and-configuration log generated by executing the install and configuration of the software according to the guide document at a user-side computer (291) and a log template generated by executing the install and configuration of the software according to the guide document at an administrator-side computer (292), and then calculates an accuracy of a guide document using the distance.

The calculation of the distance may be done by sorting logs in an install-and-configuration log by time and sorting logs in the log template by time, and using either of the following two methods:

1. masking unique information and then calculating a distance between each row in the sorted logs after the mask for the install-and-configuration log and each row in the sorted logs after the mask for the log template using the Longest Common Subsequence; the unique information may be, for example, IDs, IP addresses and time in each of the sorted logs for the install-and-configuration log and the sorted logs for the log template; or 2. classifying each log in the install-and-configuration log and each log in the log template according to types of the log, and then setting the distance as follows: a distance in a case where the types are different from each other is set so as to be longer than the distance in a case where the types are common with each other. For example, the distance in a case where the types are different from each other is set to one, and the distance in a case where the types are common with each other is set to zero.

The calculation of the accuracy of the guide document may be done by calculating a cumulative distance between each row in the sorted logs after the mask for the install-and-configuration log and each row in the sorted logs after the mask for the log template, using a dynamic programming matching, and then calculating a reciprocal of the minimum cumulative distance of each distance.

The greater the distance is, the smaller the accuracy of the guide document will be.

In a case where the installed software was unable to start after executing the install and configuration of the software, logs cannot be generated. Accordingly, the accuracy is set to zero, since it is difficult to measure the distance. In a case where typical logs which are detected during the start-up is not found, it is judged that the software is not able to be started-up.

It may be possible that an average, a median or a mode of the accuracies for all users is provided as a representative value of the accuracy.

In step 443, the administrator-side computer (292) stores the accuracy into the presentation DB.

In a case where an average, a median or a mode of the accuracies for all users is provided in step 442, the administrator-side computer (292) may store the representative value of the accuracy into the presentation DB.

In step 444, the administrator-side computer (292) presents the accuracy, evaluation value or information, such as an icon, associated with the accuracy or a combination thereof to a user. The presentation of the accuracy may be done, for example, by displaying information on the accuracy at the time when a corresponding guide document is presented on a portal site. An example of the presentation of the accuracy will be explained below by referring to FIG. 7 mentioned below.

In a case where an average, a median or a mode of the accuracies for all users is provided in step 442, the administrator-side computer (292) may present the representative value instead of the accuracy or together with the accuracy.

In step 445, the administrator-side computer (292) terminates the process mentioned above.

F. Calculation of a Goodness-of-Fit for Selecting Software

In step 451, the administrator-side computer (292) starts a process for calculating a goodness-of-fit.

In step 452, the administrator-side computer (292) calculates a goodness-of-fit, using runtime logs which is detected during executing the software. The runtime logs may be obtained by monitoring a runtime of the software after executing the install and configuration of the software.

The runtime log may comprise one or more event logs which are generated during successfully executing the software, one or more error logs which are generated during executing the software in a case where the install and configuration of the software was inappropriate, or a combination of these.

Examples of event logs may be, for example, but not limited to, a size of a log event database, the number of login or logout, for example, to a console, the number of user registrations, the number of log or flow sources, the number of customer IDs, the number of custom offence, or a combination thereof.

Examples of error logs may be, for example, but not limited to, a log recorded in response to an error detection of an event due to a parameter which was input by a user. Let us suppose the following situation for explaining an example of error logs: there is a mechanism of sending e-mail in response to detection of a security event. Under this situation, an error always occurs, since the e-mail address which was input by a user according to a guide document is inappropriate or the e-mail address was not set during an install and configuration of software. The former case happens in a case where the e-mail description on the guide document is incorrect and, accordingly, an incorrect e-mail address was set by a user. The latter case happens in a case where a setting of the e-mail address is not made due to an inappropriate description of the guide document. Accordingly, an error log is recorded in response to detection of such error.

The goodness-of-fit is a weighted sum of the one or more log events which may be obtained from the runtime log.

The calculation of the goodness-of-fit may be done using a weighted sum of each event. Let us suppose that a certain event, En, is observed as an output log and the weight of the event in the event logs or in the error logs is taken as Wn, the following formula may be used for calculating the above-mentioned goodness-of-fit:

Goodness-of-fit=sum($W_n*E_n$), where $n$=1,2,3, ... $N$, $N$ being a positive integer.

Wn may be set so as to be larger than the weight of an error in the error log. The weight of the event logs which are generated during successfully executing the software may be set to, for example, "1", and the weight of the error log which are generated during executing the software is set to, for example, "−1". It may be determined that a weight may be set to zero in a case where an error is considered to be insignificance.

It may possible that an average, a median or a mode of the goodness-of-fit for all users is provided as a representative value of the goodness-of-fit.

In step 453, the administrator-side computer (292) stores the goodness-of-fit into the presentation DB.

In a case where an average, a median or a mode of the goodness-of-fit for all users is provided in step 452, the administrator-side computer (292) may store the representative value of the goodness-of-fit into the presentation DB.

In step 454, the administrator-side computer (292) presents the goodness-of-fit, evaluation value or information, such as an icon, associated with the goodness-of-fit or a combination thereof to a user. The presentation of the goodness-of-fit may be done, for example, by displaying information on the goodness-of-fit at the time when a corresponding guide document is presented on a portal site. An example of the presentation of the goodness-of-fit will be explained below by referring to FIG. 7 mentioned below.

In a case where an average, a median or a mode of the goodness-of-fit for all users is provided in step 452, the administrator-side computer (292) may present the representative value instead of the goodness-of-fit or together with the goodness-of-fit.

In step 455, the administrator-side computer (292) terminates the process mentioned above.

G. Problem Locator

In step 461, the administrator-side computer (292) starts a process for finding a problem in the procedures described in a guide document for install and configuration of software. The finding may be done, for example, by identifying an index or indexes in which there is a problem.

In step 462, the administrator-side computer (292) may retrieve from the log template one or more logs associated with a path having a distance larger than a predetermined threshold among paths generated by the dynamic programming matching, and then searching for an index or indexes associated with the one or more logs in a mapping table of indexes in the guide document and of the log template. The details of searching for an index or indexes associated with one or more logs on the log template will be explained below by referring to FIG. 6B mentioned below.

Alternatively, in step 462, in a case where a time required for generating the install-and-configuration log at the user-side computer is larger than a time required for generating the log template at the administrator-side computer by a predetermined threshold, the administrator-side computer (292) may search for an index or indexes associated with one or more logs on the log template from a mapping table of indexes in the guide document and of the log template.

In step 463, the administrator-side computer (292) stores the retrieved index or indexes into the presentation DB.

In step 464, the administrator-side computer (292) presents the problem to a user. The presentation of the problem may be done, for example, by displaying information on the problem at the time when a corresponding guide document is presented on a portal site. The information may be added near the index or indexes in the guide document. An example of the information will be explained below by referring to FIG. 8 mentioned below.

In step 465, the administrator-side computer (292) terminates the process mentioned above.

With reference now to FIG. 5, FIG. 5 illustrates an embodiment of a portal site for selecting a guide document for install and configuration of software. The portal site may be used for enabling a user to select a guide document displayed on a display at the user-side computer.

In FIG. 5, a portal site (501) is now displayed on a display at a user-side computer.

The portal site (501) shows a manufacturer of software (511), a product name as a name of software (512), and a usage as information listed on a guide document (513).

In a case where a user wants to select a guide document, the user may click one usage among the listed usages (513) by a mouse or touch operation.

In response to the click, the user-side computer may download a guide document corresponding to the clicked information and then display the guide document on a display.

Figure 6A:
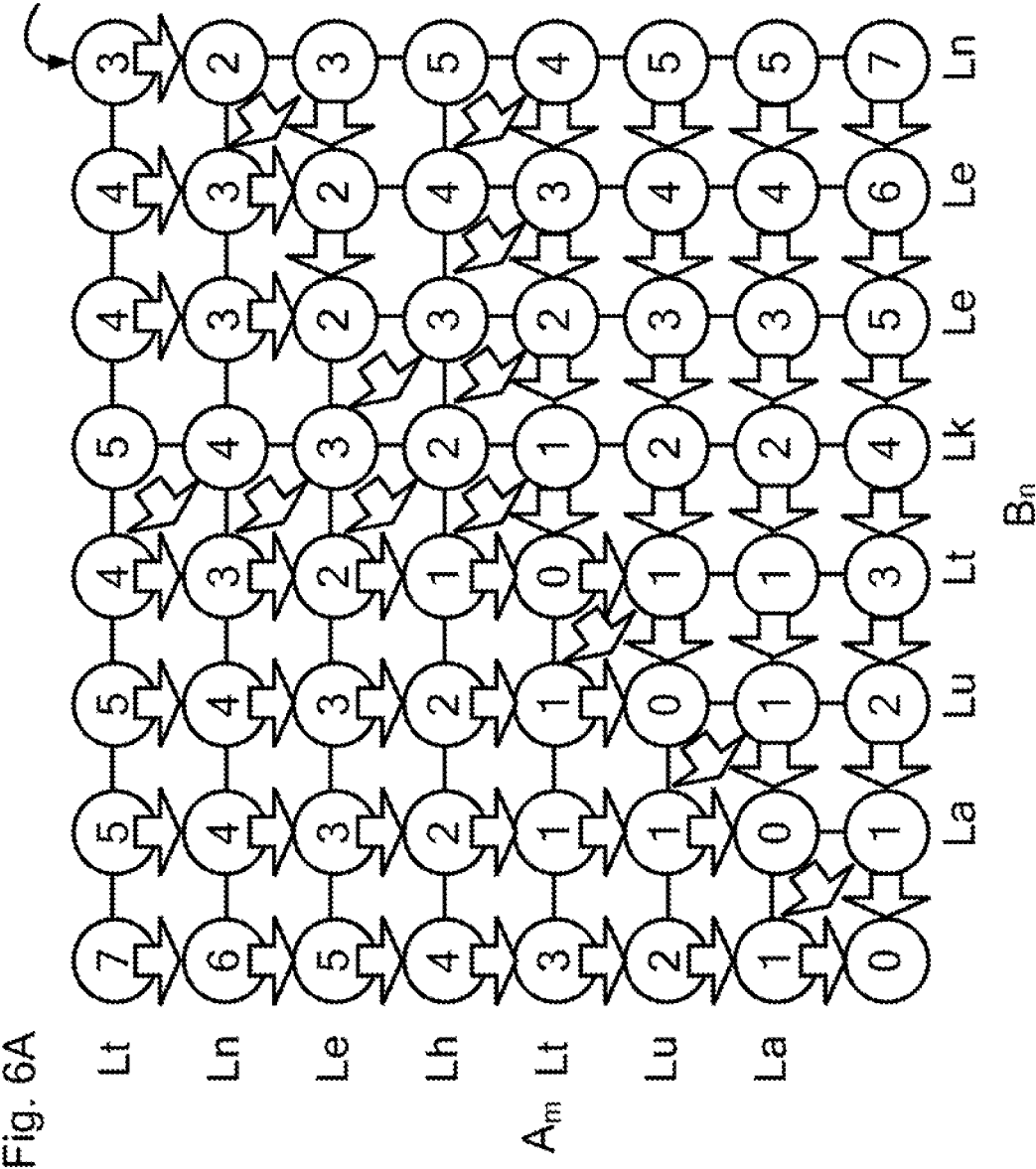
FIGS. 6A and 6B illustrate an embodiment of a diagram of a dynamic programming matching and an embodiment of a diagram of a program locator obtained using the dynamic programming matching.
Figure 6B:
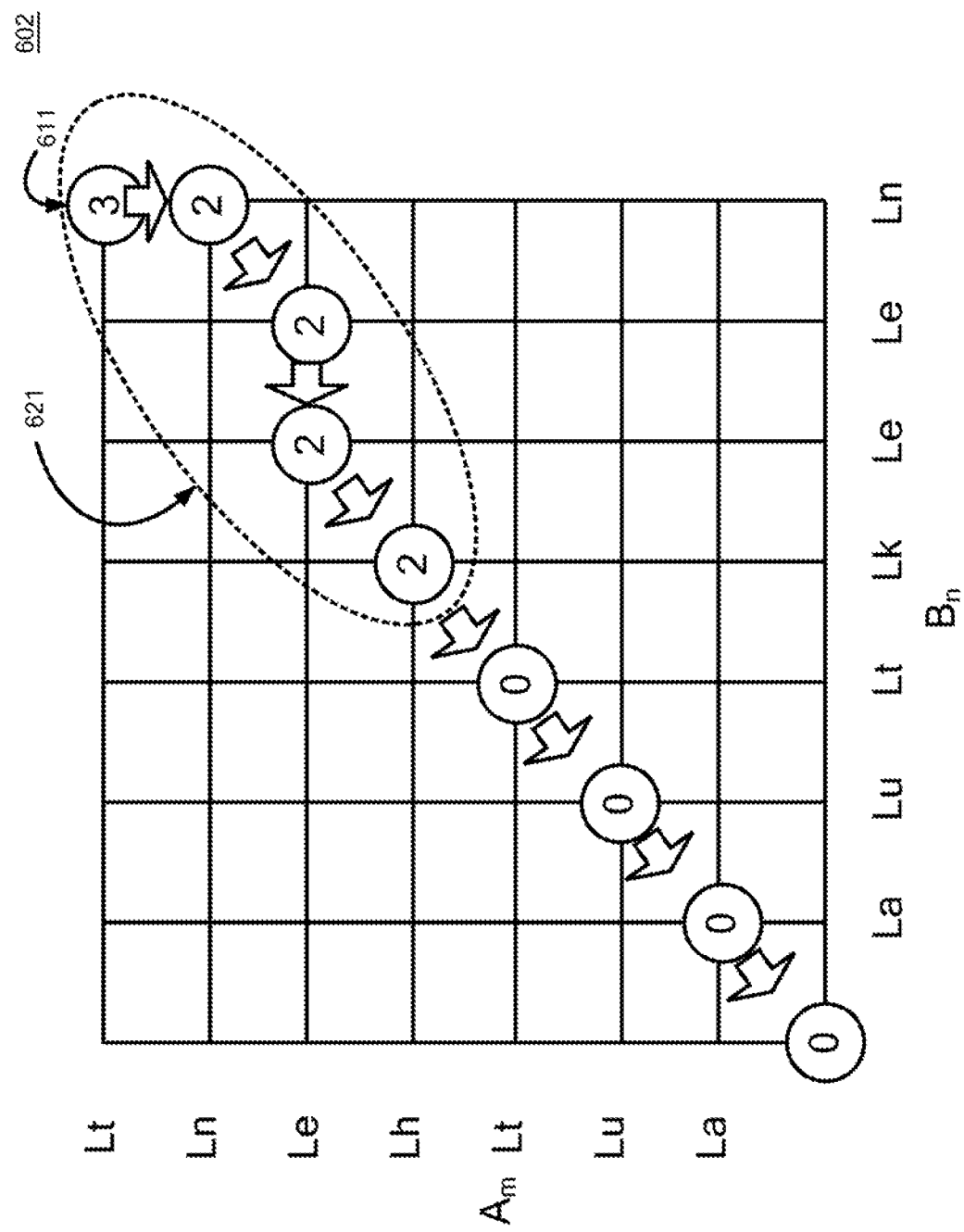

FIGS. 6A and 6B illustrate an embodiment of a diagram of a dynamic programming matching and an embodiment of a diagram of a program locator obtained using the dynamic programming matching, respectively.

With reference now to FIG. 6A, FIG. 6A illustrates an embodiment of the diagram of a dynamic programming matching.

Let us suppose that each log in the install-and-configuration log and each log in the log template are classified according to types of the log.

The diagram (601) shows that logs after classification of logs in an install-and-configuration log as "Bn" in an X-axis, and logs after classification of logs in a log template as "Am" in a Y-axis.

For Bn, each of the labels, La, Lu, Lt, Lk, Le. Le and Ln, are attached to each of the logs in the install-and-configuration log.

For Am, each of the labels, La, Lu, Lt, Lh, Le, Ln and Lt, are attached to each of the logs in a log template.

A distance between the logs after classification of logs in the install-and-configuration log and the logs after classification of logs in the log template is calculated as follows:

$$d(A_m, B_n) = \begin{cases} 0 & L(A_m) = L(B_n) \\ 1 & L(A_m) \neq L(B_n) \end{cases}$$

where $L(A_m)$ denotes a type of a log.

A cumulative distance between the logs after classification of logs in the install-and-configuration log and the logs after classification of logs in the log template is calculated as follows:

$$D(m, n) = \min \begin{cases} D(m-1, n-1) + 2d(A_m, B_n) \\ D(m, n-1) + d(A_m, B_n) \\ D(m-1, n) + d(A_m, B_n) \end{cases}$$

A minimum cumulative distance in the diagram (601) is "3", as seen in the upper-right (611). Accordingly, an accuracy of a guide document may be calculated, for example, using an index that decreases as the distance increases. The example of the index may be, for example, a reciprocal of the minimum cumulative distance. In a case where the minimum cumulative distance in the diagram (601) is "3" as mentioned above, the reciprocal of the minimum number is calculated as "⅓".

A numeral shown in each node shows a result of dynamic programming matching, that is, a distance between the logs after classification of logs in the install-and-configuration log and the logs after classification of logs in the log template.

With reference now to FIG. 6B, FIG. 6B illustrates an embodiment of the diagram of a program locator obtained using the dynamic programming matching.

The diagram (602) shows minimum cumulative distances which were generated from the diagram (601) described in FIG. 6A by a back tracking.

The part (621) in an ellipse line indicates that there are paths having a distance larger than a predetermined threshold, "1", among paths described in FIG. 6B.

This means that there is a problem in the procedures described in a guide document.

Therefore, one or more logs, associated with a path having a distance larger than a predetermined threshold among paths generated by the dynamic programming matching is retrieved from the log template as a place where there is the problem in the procedures described in the guide document, and then an index or indexes associated with the one or more logs in a mapping table of indexes in the guide document and of the log template are searched for.

Accordingly, the indexes relating to the part (621), Lh, Le, Ln and Lt in Y axis, will be searched for.

With reference now to FIG. 7, FIG. 7 illustrates an embodiment of a presentation layer according to an embodiment of the present invention.

The presentation layer may be provided, for example, in a form of a portal site for selecting a guide document for install and configuration of software.

In FIG. 7, a portal site (701) is now displayed on a display at a user-side computer or at an administrator-side computer.

The portal site (701) shows a manufacturer of software (711), a product name as a name of software (712), and a usage as information listed on a guide document (713). Further, the portal site (701) may have at least one of the following: a complexity of an install and configuration of software (714), an accuracy of a guide document (715), a goodness-of-fit for selecting software (716), and a derivation (717).

The complexity (714) may be calculated, stored and presented according to steps 431 to 435 described in FIG. 4B. A user may sort the complexity according to the value of the complexities, for example, using a slide button (721).

The accuracy may be calculated, stored and presented according to steps 441 to 445 described in FIG. 4B. A user may sort the goodness-of-fit according to the value of the goodness-of-fit, for example, using a slide button (722).

The goodness-of-fit may be calculated, stored and presented according to steps 451 to 455 described in FIG. 4B.

A user may sort the accuracy according to the value of the accuracies, for example, using a slide button (723).

The derivation may be used for sending information on an error description relating to a guide document to an administrator or administrator-side computer or for sending information on an appropriate procedure for an install and configuration of software to another user, an administrator or administrator-side computer.

According to an embodiment described in FIG. 7, a user can select a guide document according to a complexity of an install and configuration of software (714), an accuracy of a guide document (715), a goodness-of-fit for selecting software (716), or a combination thereof.

Further, according to an embodiment described in FIG. 7, a user may select a guide document that may be suitable for the user' purpose, or that may be highly reliable.

Further, according to an embodiment described in FIG. 7, an administrator can inform a user of an easiness level of an install and configuration of software, using a complexity of an install and configuration of software (714), an accuracy of a guide document (715), a goodness-of-fit for selecting software (716), or a combination thereof.

Further, according to an embodiment described in FIG. 7, a quality of a guide document can be converted into a numerical form.

Figure 8:
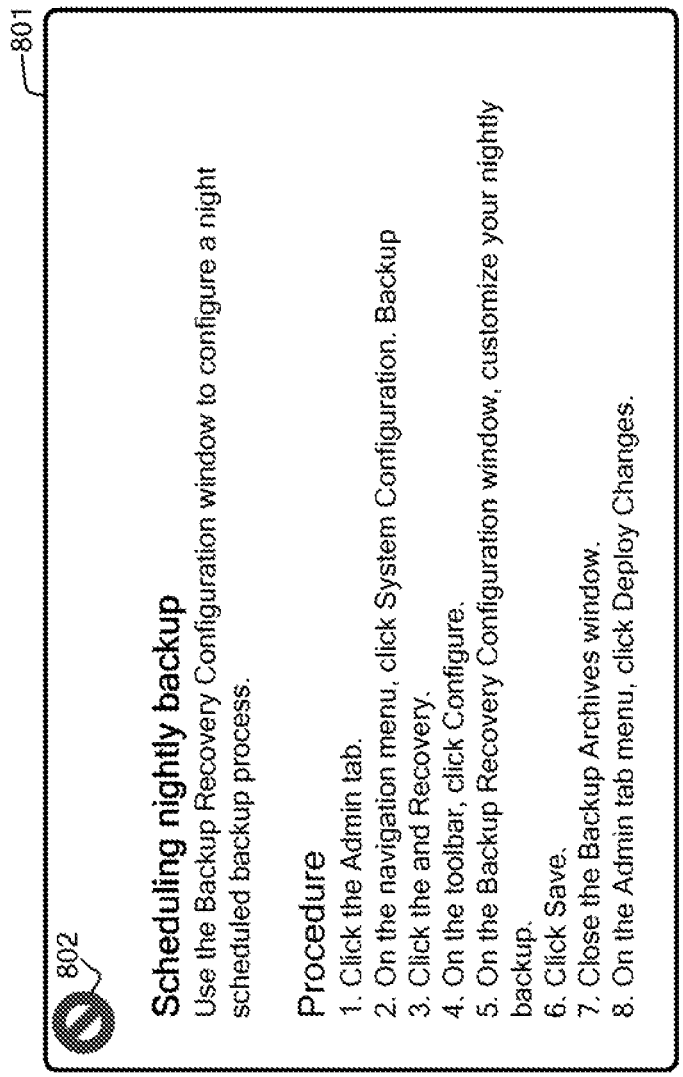
FIG. 8 illustrates an embodiment of displaying a problem on the index in a guide document for install and configuration of software.

With reference now to FIG. 8, FIG. 8 illustrates an embodiment of displaying a problem on the index in a guide document for install and configuration of software.

In FIG. 8, a window (801) displays a page having the index, "Scheduling nightly backup", in a guide document. Further, the window (801) displays an icon (802) which may show that there is a problem in procedures relating to the above-mentioned index.

According to an embodiment described in FIG. 8, an administrator may automatically find a page having the problem for executing the install and configuration of the software.

Figure 9:
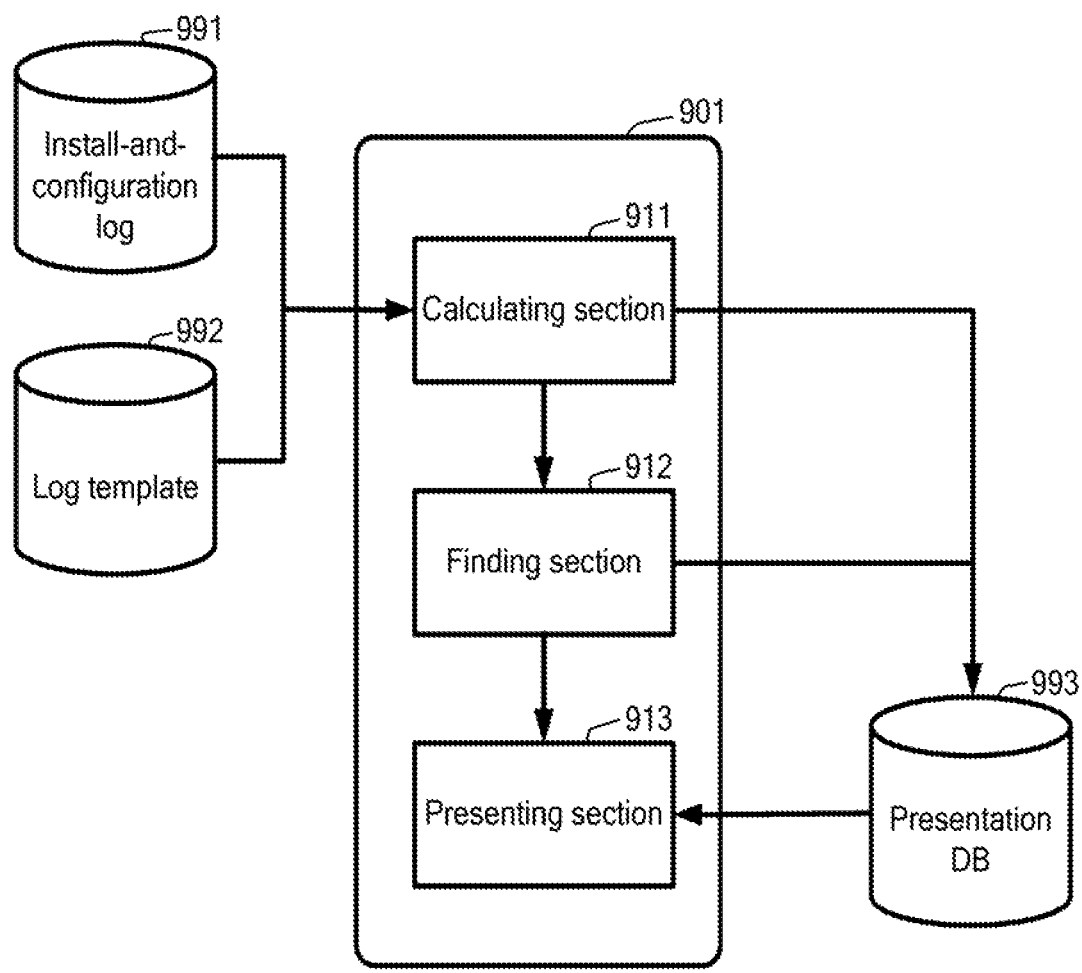
FIG. 9 illustrates an embodiment of an overall functional block diagram of system hardware used in accordance with the embodiment of the overall flowchart described in FIG. 3.

With reference now to FIG. 9, FIG. 9 illustrates an embodiment of an overall functional block diagram of system hardware used in accordance with the embodiment of the overall flowchart described in FIG. 3.

An administrator-side computer (901) may comprise a calculating section (911), a finding section (912) and a presenting section (913).

The calculating section (911) may calculate, using a dynamic programming matching, a distance between an install-and-configuration log (991) generated by executing the install and configuration of the software according to the guide document at a user-side computer and a log template (992) generated by executing the install and configuration of the software according to the guide document at an administrator-side computer.

The calculating section (911) may calculate the distance using the Longest Common Subsequence.

The calculating section (911) may calculate an accuracy of the guide document, using the distance, and then store the accuracy into a presentation DB (993). The calculating section (911) may calculate an average, a median or a mode of the accuracies for all users is provided as a representative value of the accuracy, and then store the average, the median or the mode of the accuracies into a presentation DB (993).

The calculating section (911) may calculate a goodness-of-fit, using runtime logs obtained by monitoring a runtime of the software after executing the install and configuration of the software, and then store the goodness-of-fit into a presentation DB (993). The calculating section (911) may calculate an average, a median or a mode of the goodnessof-fits for all users as a representative value of the goodness-of-fits, and then store the average, the median or the mode of the goodness-of-fits into a presentation DB (993).

The calculating section (911) may calculate a complexity of the install and configuration of the software, using runtime logs obtained by monitoring a runtime of the software after executing the install and configuration of the software, and then store the complexity into a presentation DB (993).

The calculating section (911) may perform step 304 described in FIG. 3, steps 432 and 433, steps 442 and 443, steps 452 and 453, and steps 462 and 463 described in FIG. 4B.

The finding section (912) may find a problem in the procedures, using the distance and then store the information on the problem into a presentation DB (993).

The finding section (912) may retrieve from the log template one or more logs associated with a path having a distance larger than a predetermined threshold among paths generated by the dynamic programming matching, and then search for an index or indexes associated with the one or more logs in a mapping table of indexes in the guide document and of the log template.

The finding section (912) may search for an index or indexes associated with one or more logs on the log template from a mapping table of indexes in the guide document and of the log template in a case where a time required for generating the install-and-configuration log (991) at the user-side computer is larger than a time required for generating the log template (992) at the administrator-side computer by a predetermined threshold.

The finding section (912) may perform step 305 described in FIG. 3, and step 462 described in FIG. 4B.

The presenting section (913) may present the information on the problem in association with the retrieved index or indexes.

The presenting section (913) may present the accuracy. The presenting section (913) may present the representative value of the accuracy instead of the accuracy or together with the accuracy.

The presenting section (913) may present the goodness-of-fit. The presenting section (913) may present the representative value of the goodness-of-fit instead of the goodness-of-fit or together with the goodness-of-fit.

The presenting section (913) may present the complexity. The presenting section (913) may present the complexity to a user as an indicator for selecting the guide document.

The presenting section (913) may present the retrieved index or indexes.

The presenting section (913) may perform step 306 described in FIG. 3, and steps 434, 444, 454 and 464 described in FIG. 4B.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A server computer-implemented method for finding a problem in procedures described in a guide document for install and configuration of software, the method comprising:
    calculating, using a dynamic programming matching, a distance between an install-and-configuration log generated by executing the install and configuration of the software according to the guide document at a user-side computer and a log template generated by executing the install and configuration of the software according to the guide document at an administrator-side computer;
    finding a problem in the procedures, using the distance;
    calculating a complexity of the install and configuration of the software, using runtime logs obtained by monitoring a runtime of the software after executing the install and configuration of the software at the user-side computer; and
    presenting the complexity.

2. The method according to claim 1, wherein the finding is performed by retrieving from the log template one or more logs associated with a path having a distance larger than a predetermined threshold among paths generated by the dynamic programming matching, and searching for an index or indexes associated with the one or more logs in a mapping table of indexes in the guide document and of the log template, and the retrieved index or indexes are the problem in the procedures.

3. The method according to claim 2, wherein the problem is presented in association with the retrieved index or indexes.

4. The method according to claim 1, wherein the distance is calculated using the Longest Common Subsequence.

5. The method according to claim 1, wherein each log in the install-and-configuration log and each log in the log template are classified according to types of the log, and the distance where the types are different from each other is set so as to be longer than the distance where the types are common with each other.

6. The method according to claim 1, further comprising:
    calculating an accuracy of the guide document, using the distance; and
    presenting the accuracy.

7. The method according to claim 6, wherein the accuracy is a reciprocal of a minimum cumulative distance of each distance obtained by comparing each row in the install-and-configuration log and each row in the log template.

8. The method according to claim 6, wherein the accuracy is set to zero where the software was unable to start after executing the install and configuration of the software at the user-side computer.

9. The method according to claim 6, wherein an average, a median or a mode of accuracies for all users is provided as a representative value of the accuracy and the representative value is presented instead of the accuracy or together with the accuracy.

10. The method according to claim 1, the method further comprising:
    calculating a goodness-of-fit, using runtime logs obtained by monitoring a runtime of the software after executing the install and configuration of the software at the user-side computer; and
    presenting the goodness-of-fit.

11. The method according to claim 10, wherein the runtime logs comprise one or more event logs which are generated during successfully executing the software at the user-side computer, one or more error logs which are generated during executing the software at the user-side computer where the install and configuration of the software was inappropriate, or a combination of these.

12. The method according to claim 10, wherein the goodness-of-fit is a weighted sum of one or more log events which are detected during execution of the software at the user-side computer.

13. The method according to claim 11, wherein a weight of an event in the one or more event logs is set so as to be larger than the weight of an error in the one or more error logs.

14. The method according to claim 10, wherein an average, a median or a mode of goodness-of-fits for all users is provided as a representative value of the goodness-of-fits and the representative value is presented instead of the goodness-of-fit or together with the goodness-of-fit.

15. The method according to claim 1, wherein the complexity is a weighted sum of a number of a certain operation or event during an execution of the install and configuration of the software at the user-side computer.

16. The method according to claim 1, further comprising:
providing the complexity to a user as an indicator for selecting the guide document.

17. The method according to claim 1, further comprising:
in a case where a time required for generating the install-and-configuration log at the user-side computer is larger than a time required for generating the log template at the administrator-side computer by a predetermined threshold, searching for an index or indexes associated with one or more logs on the log template from a mapping table of indexes in the guide document and of the log template; and
presenting the retrieved index or indexes.

18. A system, comprising:
a processor; and
a memory storing a program which, when executed on the processor, performs operations for finding a problem in procedures described in a guide document for install and configuration of software, the operations comprising:
calculating, using a dynamic programming matching, a distance between an install-and-configuration log generated by executing the install and configuration of the software according to the guide document at a user-side computer and a log template generated by executing the install and configuration of the software according to the guide document at an administrator-side computer;
finding a problem in the procedures, using the distance;
calculating a complexity of the install and configuration of the software, using runtime logs obtained by monitoring a runtime of the software after executing the install and configuration of the software at the user-side computer; and
presenting the complexity.

19. A computer program product for finding a problem in procedures described in a guide document for install and configuration of software, the computer program product comprising one or more computer readable storage media collectively having program instructions embodied therewith, wherein the one or more computer readable storage media are not transitory signals per se, the program instructions executable by a computer to cause the computer to perform a method comprising:
calculating, using a dynamic programming matching, a distance between an install-and-configuration log generated by executing the install and configuration of the software according to the guide document at a user-side computer and a log template generated by executing the install and configuration of the software according to the guide document at an administrator-side computer;
finding a problem in the procedures, using the distance;
calculating a complexity of the install and configuration of the software, using runtime logs obtained by monitoring a runtime of the software after executing the install and configuration of the software at the user-side computer; and
presenting the complexity.

* * * * *